(12) United States Patent
Welboren et al.

(10) Patent No.: US 12,285,130 B2
(45) Date of Patent: Apr. 29, 2025

(54) BEVERAGE EXTRACTING DEVICE

(71) Applicant: Bravilor Bonamat BV, Heerhugowaard (NL)

(72) Inventors: Adrianus Petrus Welboren, Limmen (NL); Romanus Eduard Verhoeven, Heerhugowaard (NL); Johannes Theodorus Emerentia Huiberts, Spanbroek (NL); Jan van Keulen, Amsterdam (NL)

(73) Assignee: Bravilor Bonamat BV, Heerhugowaard (NL)

( * ) Notice: Subject to any disclaimer, the term of this patent is extended or adjusted under 35 U.S.C. 154(b) by 897 days.

(21) Appl. No.: 17/476,158

(22) Filed: Sep. 15, 2021

(65) Prior Publication Data

US 2022/0000304 A1 Jan. 6, 2022

Related U.S. Application Data

(63) Continuation of application No. PCT/NL2020/050170, filed on Mar. 13, 2020.

(30) Foreign Application Priority Data

Mar. 20, 2019 (NL) .................................. 2022775

(51) Int. Cl.
*A47J 31/32* (2006.01)
*A47J 31/08* (2006.01)
(Continued)

(52) U.S. Cl.
CPC ............. *A47J 31/32* (2013.01); *A47J 31/085* (2013.01); *A47J 31/401* (2013.01); *A47J 31/408* (2013.01);
(Continued)

(58) Field of Classification Search
CPC ...... A47J 31/32; A47J 31/5251; A47J 31/461; A47J 31/5253; A47J 31/468; A47J 31/085; A47J 31/401; A47J 31/408
See application file for complete search history.

(56) References Cited

U.S. PATENT DOCUMENTS 3,306,183 A * 2/1967 Richeson .............. A47J 31/408
210/411
3,413,907 A * 12/1968 Schwertfeger ........ A47J 31/408
99/302 R
(Continued)

FOREIGN PATENT DOCUMENTS

EP 0546498 A1 6/1993
JP H0863663 A 3/1996
(Continued)

*Primary Examiner* — Jeffrey T Carley
*Assistant Examiner* — Keith Brian Assante
(74) *Attorney, Agent, or Firm* — Peacock Law P.C.; Justin R. Muehlmeyer

(57) ABSTRACT

A beverage extracting device including a vessel for receiving and mixing a powder material and hot liquid, a filter beneath the vessel, a gas pump that connects through a duct to the vessel for supplying pressurized gas into the vessel, and an outlet for extracted liquid at an outlet side of the filter which is opposite to the vessel, wherein the outlet connects to an outlet duct for the extracted liquid, wherein the duct for supplying pressurized gas into the vessel connects to a channel or channels within the vessel having outflow openings at a lower rim of the vessel to release gas into the vessel and stir the mixture inside the vessel from below in an upwards direction.

12 Claims, 6 Drawing Sheets

(51) Int. Cl.
*A47J 31/40* (2006.01)
*A47J 31/46* (2006.01)
*A47J 31/52* (2006.01)

(52) U.S. Cl.
CPC ........... *A47J 31/461* (2018.08); *A47J 31/468* (2018.08); *A47J 31/5251* (2018.08); *A47J 31/5253* (2018.08)

(56) References Cited

U.S. PATENT DOCUMENTS

| | | | | |
|---|---|---|---|---|
| 4,967,647 | A * | 11/1990 | King | A47J 31/32 99/287 |
| 5,337,653 | A * | 8/1994 | Sellers | A47J 31/408 99/287 |
| 5,778,765 | A * | 7/1998 | Klawuhn | A47J 31/469 99/290 |
| 5,992,300 | A * | 11/1999 | Fukushima | A47J 31/408 99/302 R |
| 6,041,693 | A * | 3/2000 | Fukushima | A47J 31/408 99/302 R |
| 8,286,547 | B1 * | 10/2012 | Lassota | A23F 5/18 99/283 |
| 2016/0058241 | A1* | 3/2016 | Tsutsumi | A47J 31/5251 99/283 |
| 2017/0055759 | A1* | 3/2017 | Radosav | A47J 31/3657 |
| 2018/0360256 | A1* | 12/2018 | Ford | A47J 31/0657 |
| 2019/0239678 | A1* | 8/2019 | Cao | A47J 31/5253 |
| 2020/0237124 | A1* | 7/2020 | Guo | A47J 31/20 |

FOREIGN PATENT DOCUMENTS

| | | |
|---|---|---|
| JP | 3138635 B2 | 12/2007 |
| WO | 2020190129 A1 | 9/2020 |

* cited by examiner

BEVERAGE EXTRACTING DEVICE

CROSS-REFERENCE TO RELATED APPLICATIONS

This application is a continuation application of International Patent Application No. PCT/NL2020/050170, titled "Beverage Extracting Device", filed on Mar. 13, 2020, which claims priority to and the benefit of Netherland Patent Application No. 2022775, titled "Beverage Extracting Device", filed on Mar. 20, 2019, and the specification and claims thereof are incorporated herein by reference.

BACKGROUND OF THE INVENTION

Field of the Invention

Embodiments of the present invention relate to a beverage extracting device at least comprising a vessel for receiving and mixing a powder material and hot liquid, a filter beneath the vessel, a gas pump that connects through a duct to the vessel for supplying pressurized gas into the vessel, and an outlet for extracted liquid at an outlet side of the filter, which is opposite to the vessel, wherein the outlet connects to an outlet duct for the extracted liquid. The beverage is for instance coffee, but may also be another beverage such as tea.

Background Art

A beverage extracting device is known from JP 3 138635 B2 and from EP-A-0 546 498.

JP 3 138635 B2 discloses a floor-standing machine for preparing a hot beverage.

EP-A-0 546 498 discloses a beverage extracting device, which is part of a vending machine and includes a cylinder into which a mixture liquid of hot water and material powder flows through an inlet port. A valve opens and closes the inlet port of the cylinder, and a pressure device supplies pressurized air into the cylinder. A filter block is provided with a filter, which block is biased downward by a return spring. A filter block drive mechanism is operable to move the filter block upward by rotating a vertically rotatable rotary lever upward for closing a lower opening of the cylinder. The mixture liquid in the cylinder is forcedly filtered through the filter by an inner pressure in the cylinder, which is generated by supplying the pressurized air into the cylinder while closing the inlet port of the cylinder by the valve and closing the lower opening of the cylinder by the filter. The design of the known beverage extracting device uses gravity as a driving force assisting the flow of ready liquid which eventually leave the machine, and as a consequence a user's cup for receiving the liquid extracted in the machine is to be placed below the filter.

The known beverage extracting device has several disadvantages.

One disadvantage of the known beverage extracting device is that the top-down design requires a considerable height of the machine, which is disadvantageous when the available space for the beverage extracting device is limited.

Still another disadvantage of the known beverage extracting device is that the outlet duct for the extracted liquid tends to continue dripping for a while after the extracted liquid is poured into the user's cup, unless a suitable valve is applied to perfectly close off this outlet duct.

Yet still another disadvantage of the known beverage extracting devices is that when it is embodied with the valve mentioned in the previous sentence, the heat capacity of the valve causes the liquid extracted by the device to cool down, which is particularly disadvantageous for the admirers of superhot coffee.

BRIEF SUMMARY OF THE INVENTION

It is an object of the invention to address one or more of the above problems and to realize further advantages as will become apparent hereinafter. In furtherance thereof a beverage extracting device is proposed according to the invention having the features of one or more of the appended claims.

It is noted that the different features of the beverage extracting device as discussed herein can be used independently from each other as well as in combination.

According to a first aspect of the invention, the vessel is up-and-down movable so as to enable engaging a lower rim of the vessel with the filter thereby acting as a seal, wherein the duct for supplying pressurized gas into the vessel connects to a channel or channels within the vessel having outflow openings at a lower rim of the vessel to stir the mixture inside the vessel from below in an upwards direction. With this feature the quality of the extracted liquid is improved due to an intense mixing of the mixture inside the vessel. It supports also the expelling of liquid through the filter.

In another aspect of the invention, at least a portion of the outlet duct is at least in part located above the vessel. This construction avoids the necessity of applying a valve to close off the outlet duct when the extraction is completed, yet ensures that dripping of the outlet duct is prevented. Furthermore, particularly with a first cup of extracted liquid, the temperature of the extracted liquid during pouring is better maintained. Another advantage of this construction is that the outlet opening of the outlet duct can be located above the outlet at the outlet side of the filter, which enhances the versatility of the machine of the invention, in particular by providing multiple location possibilities for the user's cup that receives the extracted liquid. The overall height of the beverage extracting device can accordingly be reduced. Without departing from the invention, it is however also possible that the outlet opening of the outlet duct can be located below the outlet at the outlet side of the filter.

Desirably the outlet opening of the outlet duct is oriented downwards and is positioned below the portion of the outlet duct which is located above the vessel. Particularly the portion of the outlet duct that is located above the vessel ensures that dripping of extracted liquid stops immediately when the users cup is filled up with extracted liquid and the machine has stopped to expel further liquid into the user's cup.

A particular feature which can be applied independent from any of the other features mentioned herein is that expelling the extracted liquid through the outlet duct requires operation of the gas pump. The gas pump is then instrumental in the operation of the machine, so that by a dedicated manner of operation of the gas pump, the complete operation of the beverage extracting device can be defined. It is remarked that usually the gas pump is used for pumping air, but it is also possible to pump nitrogen which has benefits in terms of securing the quality of the extracted liquid, particularly when it concerns coffee. It is also possible to supply an aerosol to provide the extracted liquid with a desired flavour, for instance whiskey or cognac when brewing coffee.

In the device known from EP-A-0 546 498, the vessel has a closable opening at its upper side for supply of the powder material and hot liquid, which closable opening is provided with a valve for opening and closing of said opening, wherein the valve is arranged to provide an airtight closure of the opening of the vessel such that the vessel is enabled to be pressurized by the operation of the gas pump.

Preferably, the beverage extracting device of the present invention employs the feature that the valve is closable simultaneously with the operation of the gas pump so as to pressurize the vessel and drive the liquid within the vessel through the filter beneath the vessel. The duration of operation of the gas pump then exactly defines the duration that liquid is expelled through the filter beneath the vessel to fill up the user's cup that is supposed to be placed below the outlet opening of the outlet duct. Also, this feature can be applied independently from any of the other features of the invention, or in combination therewith.

According to another aspect of the invention, the filter is embodied as a movable endless belt, therewith arranging that a clean part of the endless belt is always available when extracting a new cup of liquid.

Preferably the belt is rotatable when the vessel is lifted from the belt for disposing of the powder material that remains on the belt after extraction.

It is further preferred that a scraper engages the belt from below for scraping off remains of the powder material.

Although the beverage extracting device of the invention can be operated with only the belt acting as a filter, it is also possible that the filter further comprises a paper filter part. At times applying such a paper filter part is desired to block certain fine and potentially damaging particles.

Suitably the paper filter part is supported by the endless belt.

In one particular embodiment of the beverage extracting device of the invention, a measurement device or devices connect to one of the vessel and the gas pump to measure at least one of the pressure in the vessel and the power of the gas pump. This information can be used to prevent unnecessary operation of the gas pump, and can be used to restrict the extraction time to the time that is actually needed. The information may indicate also that the filter may require cleaning for removal of pollution that partially blocks the filter. It may even indicate that the feedstock for the beverage extracting device in a canister of the device is nearly empty.

It is further desirable that a temperature sensor monitors a temperature at the outlet for extracted liquid at the outlet side of the filter. The information from the temperature sensor may be used to stop operation of the gas pump when the temperature drops, which is an indication that all fluid has been expelled through the filter.

As an alternative it is possible that an optical sensor is provided for monitoring the presence of fluid at the outlet for extracted liquid at the outlet side of the filter.

The measurement device or devices, and the temperature sensor or optical sensor may be applied independent from any of the other features as discussed herein, or in combination therewith.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention.

The drawings are only for the purpose of illustrating one or more embodiments of the invention and are not to be construed as limiting the invention. The invention will hereinafter further be elucidated with reference to the drawing pertaining to a beverage extracting device according to the invention. In the drawings.

DETAILED DESCRIPTION OF THE INVENTION

Figure 1:
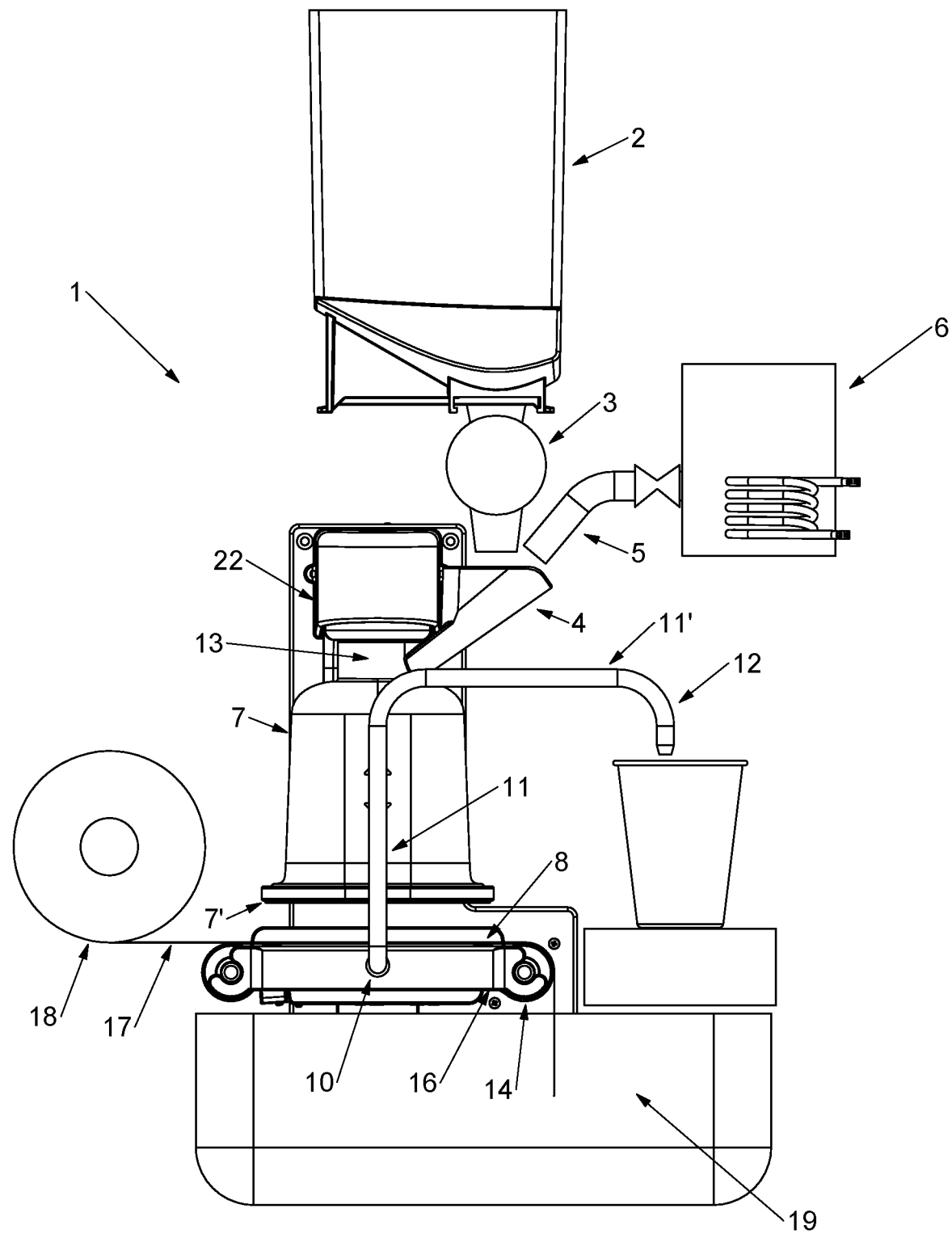
FIG. 1 shows a frontal view of an embodiment of the beverage extracting device of the invention.

Whenever in the figures the same reference numerals are applied, these numerals refer to the same parts.

Figure 2:
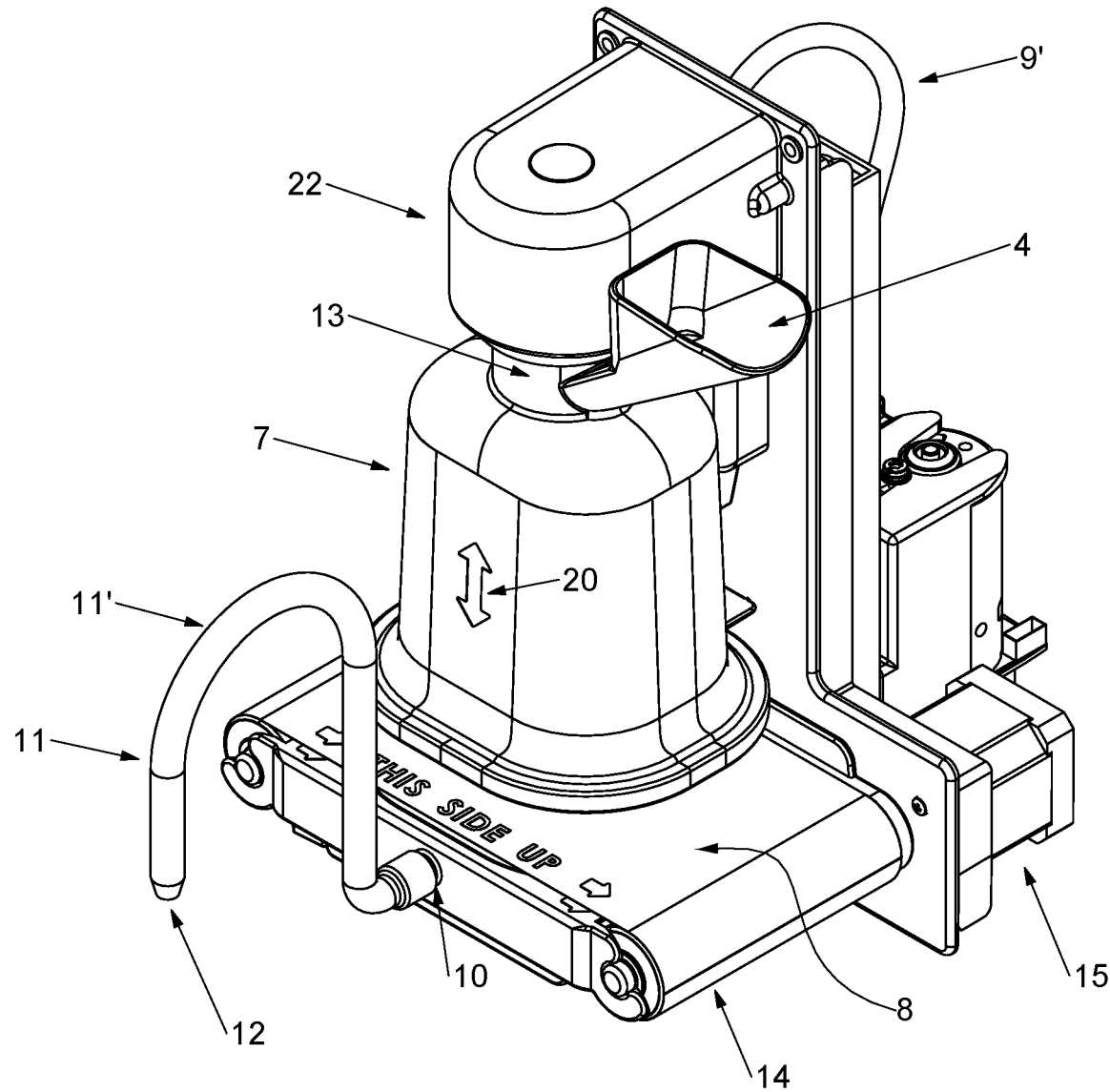
FIG. 2 shows relevant parts of a first embodiment of the beverage extracting device of FIG. 1.
Figure 3:
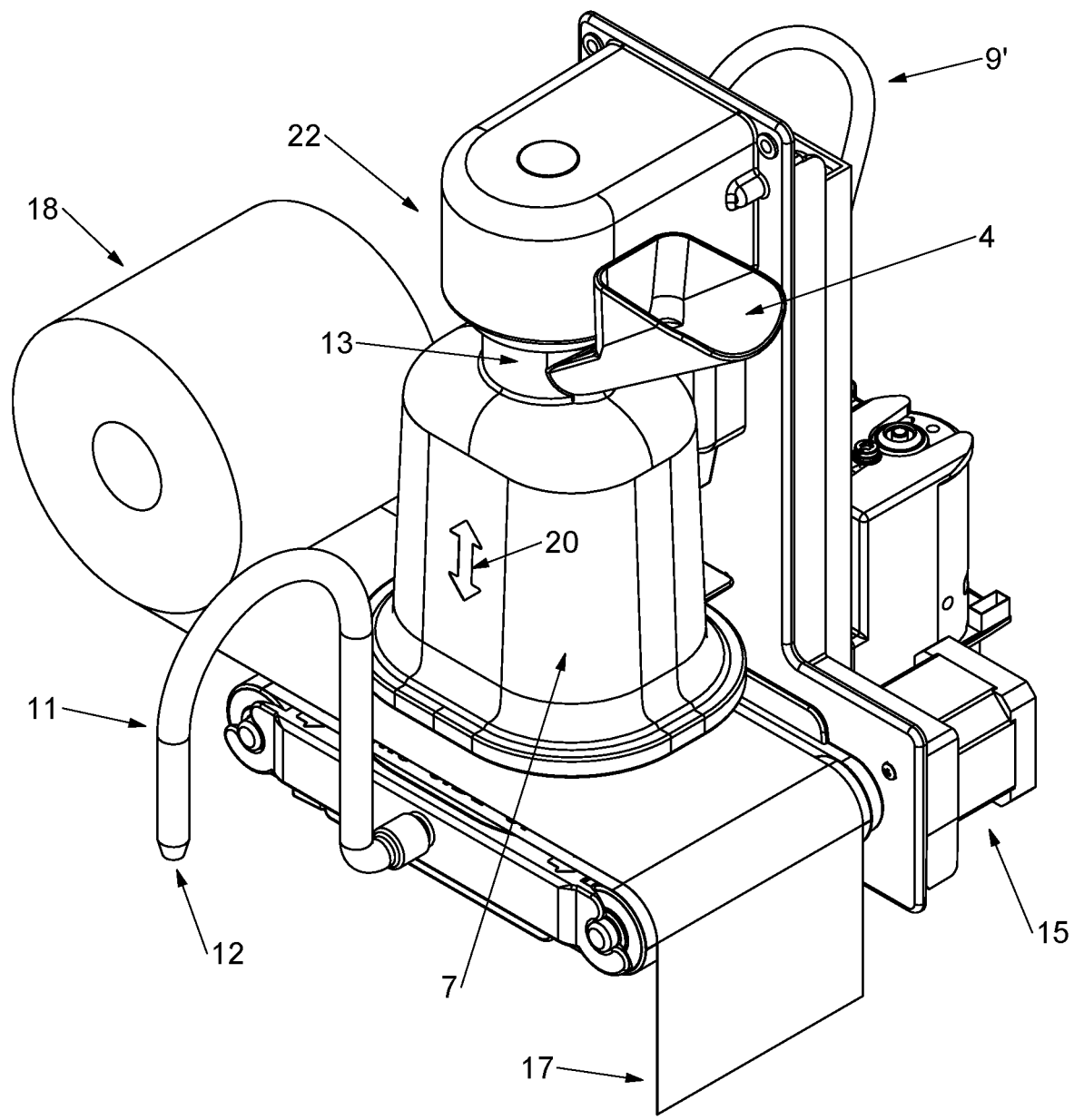
FIG. 3 shows relevant parts of a second embodiment of the beverage extracting device of FIG. 1.

In FIG. 1 the beverage extracting device 1 is shown to comprise a canister 2 for beans, for instance coffee beans. Below the canister 2 is a grinder 3 that provides grinded beans to a chute 4, as also shown in FIGS. 2 and 3. The chute 4 also receives hot water from a duct 5 that receives the hot water from a heater 6 to which the duct 5 is connected. The hot water ensures that the grinded beans from the grinder 3 are transported and received in a vessel 7 to which the chute 4 connects. To accommodate one and another the vessel 7 has a closable opening at a location 13 at the upper side of the vessel 7 for receiving both the powder material and the hot liquid.

With reference also to the FIGS. 2 and 3, the closable opening is provided with a (not shown) valve at the height of arrow 13 for opening and closing of said opening, wherein the valve is arranged to provide an airtight closure of the opening of the vessel 7 such that the vessel 7 is enabled to be pressurized by the operation of a gas pump 9. The location and operation of the valve is also known from the prior art document EP-A-0 546 498; it is therefore superfluous to further show this in the drawing. The gas pump 9 connects through a duct 9' as shown in FIGS. 2 and 3 to the vessel 7 for supplying pressurized gas into the vessel 7.

In connection with the pressurization of the vessel 7, it is preferred that the vessel 7 is movable up-and-down as symbolized by the double arrow 20, to enable that in the down position the vessel 7 can engage a filter 8 beneath the vessel 7 and act on that filter 8 as a seal. The importance of this will become clear from a discussion later in this description.

Figure 7:
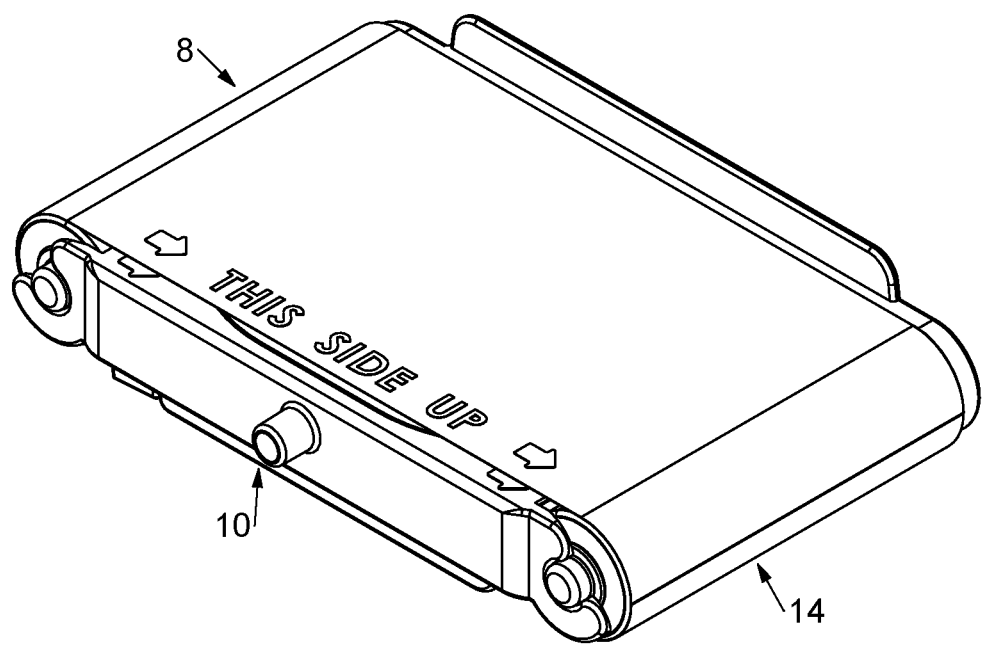
FIG. 7 shows a 3D view from above at the frame of FIG. 6.

In another aspect the beverage extracting device 1 also has an outlet 10 as clearly shown in the detail of FIG. 7, which outlet 10 is intended for release of extracted liquid at an outlet side of the filter 8 which is opposite to the vessel 7. Said outlet 10 connects to an outlet duct 11 as shown in FIGS. 1, 2 and 3 for the extracted liquid, wherein the outlet duct 11 has an outlet opening 12 distant from the outlet 10, which outlet opening 12—as the figures show—is positioned above the outlet 10 at the outlet side of the filter 8.

The FIGS. 1-3 further show that at least a portion 11' of the outlet duct 11 is located above the vessel 7, and that the outlet opening 12 of the outlet duct 11 is oriented downwards and is positioned below the portion 11' of the outlet duct 11 which is at least in part above the vessel 7.

In use expelling of extracted liquid through the outlet duct 11 requires operation of the gas pump 9, as will become apparent from the following discussion.

Figure 4:
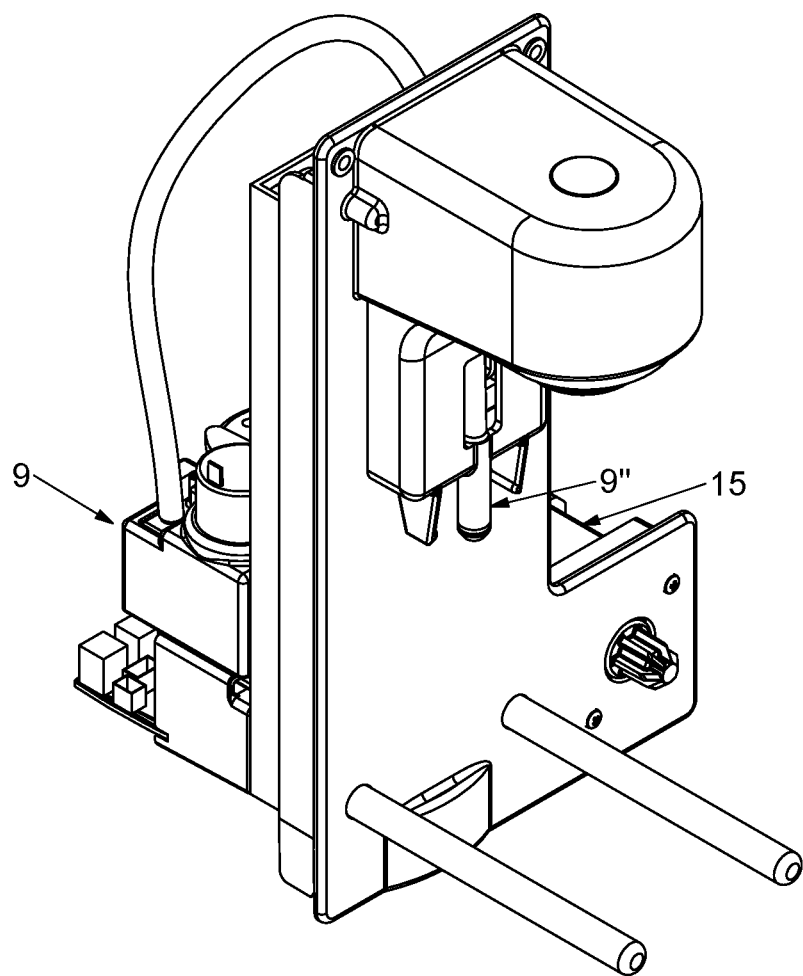
FIG. 4 shows a frame part of the beverage extracting device of FIG. 1.
Figure 5:
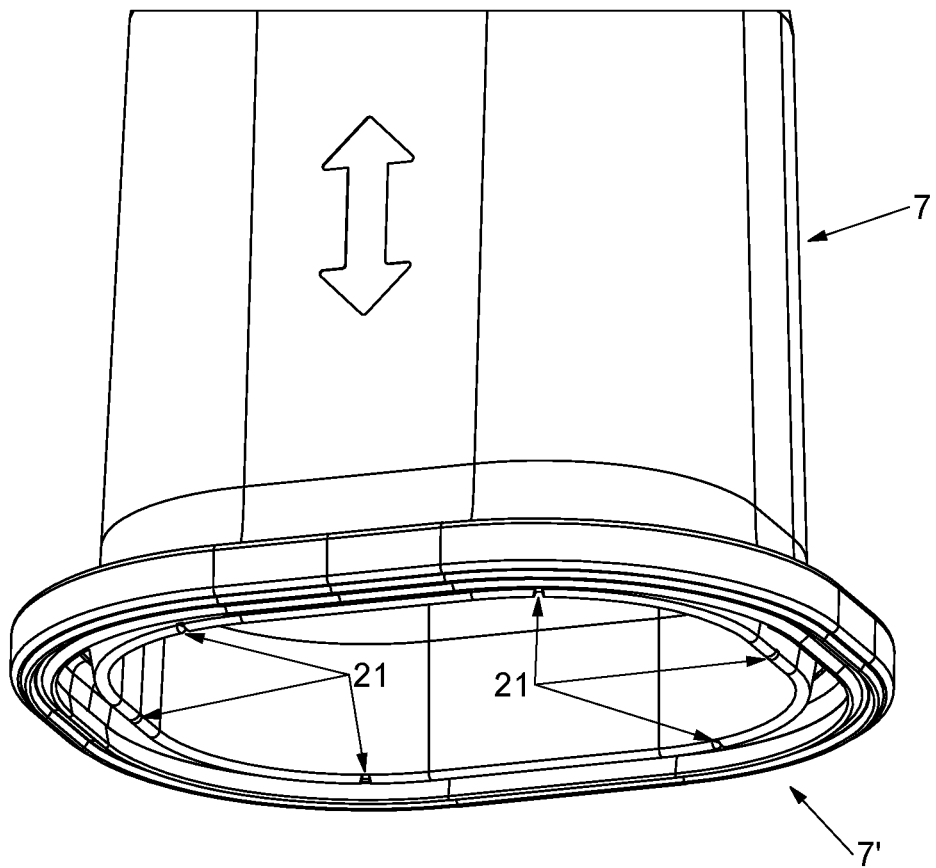
FIG. 5 shows a 3D view from below at the vessel used in the beverage extracting device of FIG. 1.

The duct 9' for supplying pressurized gas into the vessel 7 connects via a duct outlet 9" shown in FIG. 4 to a channel or channels (not shown) within the vessel 7 having outflow openings 21 at a lower rim 7' of the vessel 7 that are inwards directed to release gas into the vessel 7 and stir the mixture inside the vessel 7 from below in an upwards direction. These outflow openings 21 at the lower rim 7' of the vessel 7 are shown in FIG. 5.

As already mentioned, the vessel 7 has an opening at a location 13 at the upper side of the vessel 7 for receiving the powder material and hot liquid, which opening is closable with a valve. A drive 22 for this valve can be operated to close the valve during the operation of the gas pump 9 so as to pressurize the vessel 7 and drive the liquid within the vessel 7 through the filter 8 beneath the vessel 7, when the lower rim 7' of the vessel 7 is brought into tight engagement with the filter 8 thereby acting as a seal on this filter 8. The only escape for the liquid is then indeed through the filter 8.

Figure 6:
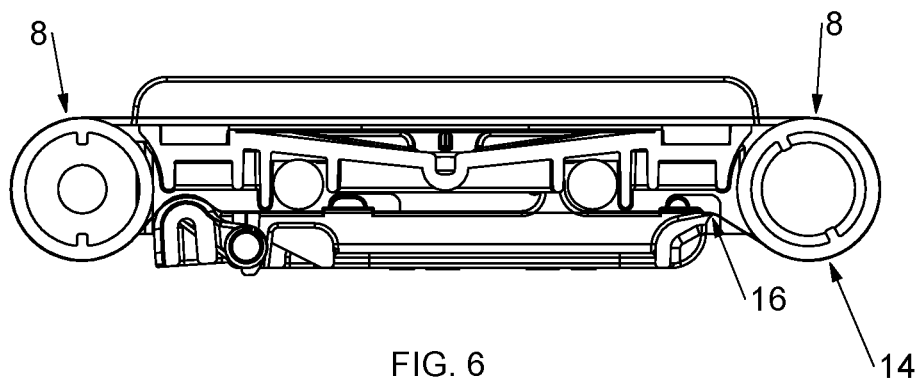
FIG. 6 shows a side view at a frame carrying the belt that acts as a filter forming part of the beverage extracting device of FIG. 1.

In the embodiments shown in the FIGS. 1-3, the filter 8 is embodied as a movable endless belt 14, which is preferably driven by a motor 15. The belt 14 is rotatable when the vessel 7 is lifted from the belt 8 which serves then for disposing of the powder material that remains on the belt 8 after extraction is completed. This remainder of powder material is collected in a waste bin 19. To promote removal of the powder material from the belt 14 it is preferable that a scraper 16 engages the belt 14 from below for scraping off the remains of the powder material. This is best shown in FIG. 6.

FIGS. 1 and 3 further show that as an option the filter may comprise a paper filter part 17, which can be supplied from a paper filter drum 18. The paper filter part 17 is then preferably supported by the endless belt 14.

In an embodiment a measurement device connects to one of the vessel 7 and the gas pump 9 to measure one of the pressure in the vessel 7 and the power of the gas pump 9.

In another embodiment a temperature sensor monitors a temperature at the outlet 10 for extracted liquid at the outlet side of the filter 8.

In an alternative embodiment an optical sensor is provided for monitoring the presence of fluid at the outlet 10 for extracted liquid at the outlet side of the filter 8.

Although the invention has been discussed in the foregoing with reference to exemplary embodiments of the beverage extracting device of the invention, the invention is not restricted to these embodiments which can be varied in many ways without departing from the invention. The discussed exemplary embodiments shall therefore not be used to construe the appended claims strictly in accordance therewith.

On the contrary the embodiments are merely intended to explain the wording of the appended claims without intent to limit the claims. The scope of protection of the invention shall therefore be construed in accordance with the appended claims only, wherein a possible ambiguity in the wording of the claims shall be resolved using these exemplary embodiments.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

The invention claimed is:

1. A beverage extracting device comprising:
   a vessel for receiving and mixing a powder material and hot liquid;
   a filter beneath the vessel;
   a gas pump that connects through a duct to the vessel for supplying pressurized gas into the vessel; and
   an outlet for extracted liquid at an outlet side of the filter which is opposite to the vessel, wherein the outlet connects to an outlet duct for the extracted liquid, and wherein the vessel is up-and-down movable so as to enable engaging a lower rim of the vessel with the filter thereby acting as a seal, wherein the duct for supplying pressurized gas into the vessel connects to a channel or channels within the vessel having outflow openings at the lower rim of the vessel to release gas into the vessel and stir the mixture inside the vessel from below in an upwards direction, wherein the outlet duct has an outlet opening distant from the outlet, which outlet opening is positioned above the outlet at the outlet side of the filter and wherein the outlet opening of the outlet duct is oriented downwards and is positioned below the portion of the outlet duct which is located above the vessel.

2. The beverage extracting device according to claim 1, wherein at least a portion of the outlet duct is at least in part located above the vessel.

3. The beverage extracting device according to claim 1, wherein expelling the extracted liquid through the outlet duct requires operation of the gas pump.

4. The beverage extracting device according to claim 1, wherein the vessel comprises a closable opening at its upper side for supply of the powder material and hot liquid, which closable opening is provided with a valve for opening and closing said opening, wherein the valve is arranged to provide an airtight closure of the opening of the vessel such that the vessel is enabled to be pressurized by the operation of the gas pump, and wherein the valve is closable during the operation of the gas pump so as to pressurize the vessel and drive the liquid within the vessel through the filter beneath the vessel.

5. The beverage extracting device according to claim 1, wherein the filter comprises a movable endless belt.

6. The beverage extracting device according to claim 5, wherein the belt is rotatable when the vessel is lifted from the belt for disposing of the powder material that remains on the belt after extraction.

7. The beverage extracting device according to claim 5, further comprising a scraper, the scraper capable of engaging the belt from below for scraping off remains of the powder material.

8. The beverage extracting device according to claim 1, wherein the filter comprises a paper filter part.

9. The beverage extracting device according to claim 8, wherein the filter comprises a movable endless belt and the paper filter part is supported by the endless belt.

10. The beverage extracting device according to claim 1, further comprising a measurement device connected to at least one of the vessel and the gas pump, the measurement device capable of measuring at least one of the group consisting of: the pressure in the vessel, and the power consumed by the gas pump.

11. The beverage extracting device according to claim 1, further comprising a temperature sensor capable of monitoring a temperature at the outlet for extracted liquid at the outlet side of the filter.

12. The beverage extracting device according to claim 1, further comprising an optical sensor capable of monitoring the presence and/or quality of fluid at the outlet for extracted liquid at the outlet side of the filter.

\* \* \* \* \*